United States Patent
Ubiñana Felix (10) Patent No.: US 10,788,063 B2
(45) Date of Patent: Sep. 29, 2020

(54) CLAMP FOR COUPLING PROPS TO BEAMS, PROP COMPRISING SAME AND ASSEMBLY METHOD

(71) Applicant: SISTEMAS TECNICOS DE ENCOFRADOS, S.A., Parets del Valles (Barcelona) (ES)

(72) Inventor: Jose Luis Ubiñana Felix, Parets del Valles (ES)

(73) Assignee: Sistemas Tecnicos de Encofrados, S.A., Parets del Valles (Barcelona) (ES)

( * ) Notice: Subject to any disclaimer, the term of this patent is extended or adjusted under 35 U.S.C. 154(b) by 0 days.

(21) Appl. No.: 15/763,396

(22) PCT Filed: Sep. 21, 2016

(86) PCT No.: PCT/ES2016/070658
§ 371 (c)(1),
(2) Date: Apr. 17, 2018

(87) PCT Pub. No.: WO2017/055654
PCT Pub. Date: Apr. 6, 2017

(65) Prior Publication Data
US 2018/0306220 A1    Oct. 25, 2018

(30) Foreign Application Priority Data
Oct. 1, 2015 (ES) .................................. 201531411

(51) Int. Cl.
*F16B 2/24* (2006.01)
*E04G 11/48* (2006.01)
(Continued)

(52) U.S. Cl.
CPC .............. *F16B 2/248* (2013.01); *E04G 11/48* (2013.01); *E04G 11/50* (2013.01); *E04G 25/02* (2013.01); *E04G 25/04* (2013.01); *F16B 7/0486* (2013.01)

(58) Field of Classification Search
USPC ........... 248/228.7, 231.81, 316.7, 351, 354.1
See application file for complete search history.

(56) References Cited

U.S. PATENT DOCUMENTS

| | | | | |
|---|---|---|---|---|
| 1,611,783 | A | * 12/1926 | Schirmer | ................ F16B 2/248 |
| | | | | 403/387 |
| 2,064,290 | A | * 12/1936 | Campbell | ................ F16L 3/24 |
| | | | | 174/40 CC |

(Continued)

FOREIGN PATENT DOCUMENTS

| | | |
|---|---|---|
| CA | 2739414 A1 | 11/2012 |
| CH | 679175 A5 | 12/1991 |

(Continued)

OTHER PUBLICATIONS

International Search Report and Written Opinion dated Jan. 12, 2017 in 14 pages.

(Continued)

*Primary Examiner* — Alfred J Wujciak
(74) *Attorney, Agent, or Firm* — Knobbe, Martens, Olson & Bear, LLP (57) ABSTRACT

An elastic clamp is for coupling props to beams. The clamp includes a minimum of two elastic wings able to hold and exert pressure on opposite lateral faces of the beam to be supported by the prop. The clamp allows the prop to be retained in a place selected along the beam to be supported, and prevents the prop from falling and rotating sideways.

13 Claims, 5 Drawing Sheets

(51) Int. Cl.
*E04G 11/50* (2006.01)
*E04G 25/04* (2006.01)
*E04G 25/02* (2006.01)
*F16B 7/04* (2006.01)

(56) References Cited

U.S. PATENT DOCUMENTS

| | | | | | |
|---|---|---|---|---|---|
| 2,235,397 | A | * | 3/1941 | Church | E04F 13/045 24/326 |
| 2,767,440 | A | * | 10/1956 | Nelsson | E04B 9/16 403/387 |
| 2,998,109 | A | * | 8/1961 | Jahn | F16B 2/248 24/326 |
| 5,768,843 | A | * | 6/1998 | Dziedzic | E04B 9/18 248/228.7 |

FOREIGN PATENT DOCUMENTS

| | | | |
|---|---|---|---|
| DE | 9216252 | U1 | 2/1993 |
| DE | 19726102 | A1 | 1/1998 |
| EP | 2309077 | A2 | 4/2011 |
| ES | 1061027 | U | 12/2005 |
| ES | 2262439 | A1 | 11/2006 |
| ES | 2296426 | A1 | 4/2008 |
| FR | 2159775 | A5 | 6/1973 |
| GB | 1057138 | A | 2/1967 |

OTHER PUBLICATIONS

Extended European Search Report for EP Application No. 16850419, dated Mar. 21, 2019 in 11 pages.

\* cited by examiner

CLAMP FOR COUPLING PROPS TO BEAMS, PROP COMPRISING SAME AND ASSEMBLY METHOD

CROSS-REFERENCE TO RELATED APPLICATIONS

This application is the U.S. National Phase under 35 U.S.C. § 371 of International Application PCT/ES2016/070658, filed Sep. 21, 2016, which claims priority to Spanish Patent Application No. P201531411, filed Oct. 1, 2015. The disclosures of the above-described applications are hereby incorporated by reference in their entirety.

FILED OF THE INVENTION

The present invention is intended to disclose a clamp for coupling props to beams, especially for supporting shuttering for floor's slab, a prop that incorporates said clamp and a method for assembly of the prop with the incorporated clamp on the beam that it is to support. Although the invention will be applied especially in the civil engineering sector and, in particular, for supporting beams for shuttering for floor's slab, it could also be applied in other industrial sectors and, in particular, for other applications in the construction sector.

BACKGROUND OF THE INVENTION

In props of the type known at present, the prop is usually centred by an upper recess thereof projecting somewhat from the beam or else, in some cases, by using nails that are inserted in the wooden part of the beam to prevent sideways displacement of the prop, which could cause the latter to fall. It is especially sensitive, especially in the case of beams supported by three or more props, since any imbalance of the loads on the individual props may inadvertently cause some of them to be without loading, which, apart from representing an imbalance in load distribution, may present the danger of unexpected falling of the prop that is no longer under load.

In order to overcome this drawback, the inventor carried out tests and experiments to obtain the present invention, which comprises a novel clamp intended for fixing the prop to a beam, said prop incorporating the clamp, as well as the particular, novel assembly process for incorporating the clamp on the prop and the assembly of the latter on the bottom part of the beam. The invention greatly improves the quick, safe coupling of props on the beams that they are to support and, in particular, avoids the arrangement of centring projections of the prop on the beam and, in particular, the insertion of nails in the case of mixed beams, to allow centring thereof, since the insertion of nails damages the beam and requires appreciable manual work both for nailing and for unnailing, and it must be pointed out that in the very common case of using nails for centring the beam, it additionally requires the labourer to work at the required height to be able to reach the wooden part of the mixed beam, which presents obvious dangers, in addition to the need to move suitable means manually, for example a ladder or similar, from place to place as the work progresses.

The aim of the present invention is to overcome the aforementioned drawbacks, and discloses a clamp for coupling on props to allow them to be coupled to the beams that they are to support, a prop that incorporates the clamp and a method for assembly of the clamp and the prop, which is inherent in the nature of the invention. Application of the invention avoids the arrangement of centring projections on the prop as well as the nailing of nails for centring it, making it possible to position the prop in a more suitable place along the beam, moreover its positioning is quick and easy, from the ground, the prop being centred on the bottom part of the beam without any possibility of falling sideways.

SUMMARY OF THE INVENTION

To achieve its purpose, the present invention envisages a clamp that can be coupled to the upper end of a prop, said clamp having transverse elastic wings that are applied, preferably, but not exclusively, fixed on the upper end of the prop for supporting a beam, whose transverse elastic wings are able to act upon the opposite side walls of the beam to be supported, so that the prop is centred and held laterally by said wings that act on the beam that it is supporting, facilitating the positioning of the prop and preventing it from falling, as it is retained by the aforementioned wings. The clamp according to the invention can be sold as a separate item to be incorporated on existing props or else it can be incorporated, fixed or detachable, in the top plate of a prop, giving rise to a prop with the clamp attached. In view of the structure of the new prop, which incorporates the clamp of the invention, it can be positioned at any point along the beam that it is to support, thus facilitating its assembly by a worker located on the ground or floor of the structure, who will easily be able to select the most suitable places along the beam. The formation of the clamp according to the invention and its incorporation on a prop, as well as assembly thereof for coupling the prop to a shuttering supporting beam for floor's slap comprises a method of assembly that is a characteristic feature of the present invention, and comprises firstly assembly of the clamp on the top plate of a prop, fixed or detachable, so that the clamp is in an arrangement of elastic coupling to the supporting beam, the method then comprising displacement of the prop bearing the clamp directed towards the bottom part of the supporting beam, with pressing of the prop from the bottom part of the beam for elastically coupling each of the flanges of the beam on the corresponding side of the supporting beam. This type of coupling will be executed at the most suitable point along the supporting beam to avoid interference with other elements, but without having to limit its assembly to precise points of the beam.

The embodiment of the aforementioned elastic wings of the clamp may vary considerably, preferably being made from a spring steel rod suitably folded so that a single part made of steel rod is connected to the top plate of the prop forming the two wings, for example, by means of a single elastic rod folded so that it forms a central retaining loop into which the top plate of the prop is introduced, and two wings, each constituting retaining projections above the level of the top plate of the prop and whose ends are retained in respective holes in said plate. However, said wings of the clamp could consist of individual rod elements, separate from one another.

In the preferred version of the prop made from a single rod of spring steel, each of the wings assumes a shape projecting at an angle, with the vertex in the upper part, each of the wings having an arm for lateral pressing of the beam and another displaced slightly laterally with respect to the first, intended for fixing the part made of steel rod in one of the usual holes of the plate of the prop. Therefore, each of the aforementioned wings has an arm in contact with a side wall of the beam and an arm intended for centring the beam, which on being slightly displaced will interact with the rotation of the prop, limiting the rotation of the prop about its axis after being coupled to the beam.

Besides the preferred embodiment as a rod of spring steel suitably folded to form the retaining loop in the plate and the wings of the form projecting at an angle and arms with slight lateral displacement, as has been indicated, it would also be possible, for carrying out the present invention, to use wings welded on the top plate of the prop or else laminar wings suitably die-cut and curved. It would also be possible to provide wings with a single arm, or other equivalent types.

The invention would allow other embodiments of fixing the elastic wings to the top plate of the prop, for example, by hot riveting of pivots of the wings in holes in the plate or others.

Moreover, although the preferred material for making the elastic wings of the clamp will be spring steel, whether in rod or sheet form, wings made of plastic could also be provided, to be incorporated detachably on the top plate of the prop.

It could also be envisaged that the wings of the clamp are formed by respective prolongations of the top plate of the prop.

BRIEF DESCRIPTION OF THE DRAWINGS

For better understanding of the present invention, drawings are appended that are representative of a preferred embodiment of the prop for civil engineering work that is the subject matter thereof, which are simply of a representative nature of embodiment examples, but do not limit the scope of the invention.

DETAILED DESCRIPTION OF THE PREFERRED EMBODIMENTS

As is shown in the figures, the prop, which is one of the objects of the present invention, comprises a right foot -1- that is intended to rest on the ground or floor of the structure, and has, although they are not shown, means for varying the height and for fixing at the height selected, as well as a top supporting plate -2- that is to receive the corresponding load at the place of support with the beam -3-, which is shown in the figure as a mixed beam formed by a lower element -4- made of wood and a tubular upper element -5- made of steel.

Figure 4:
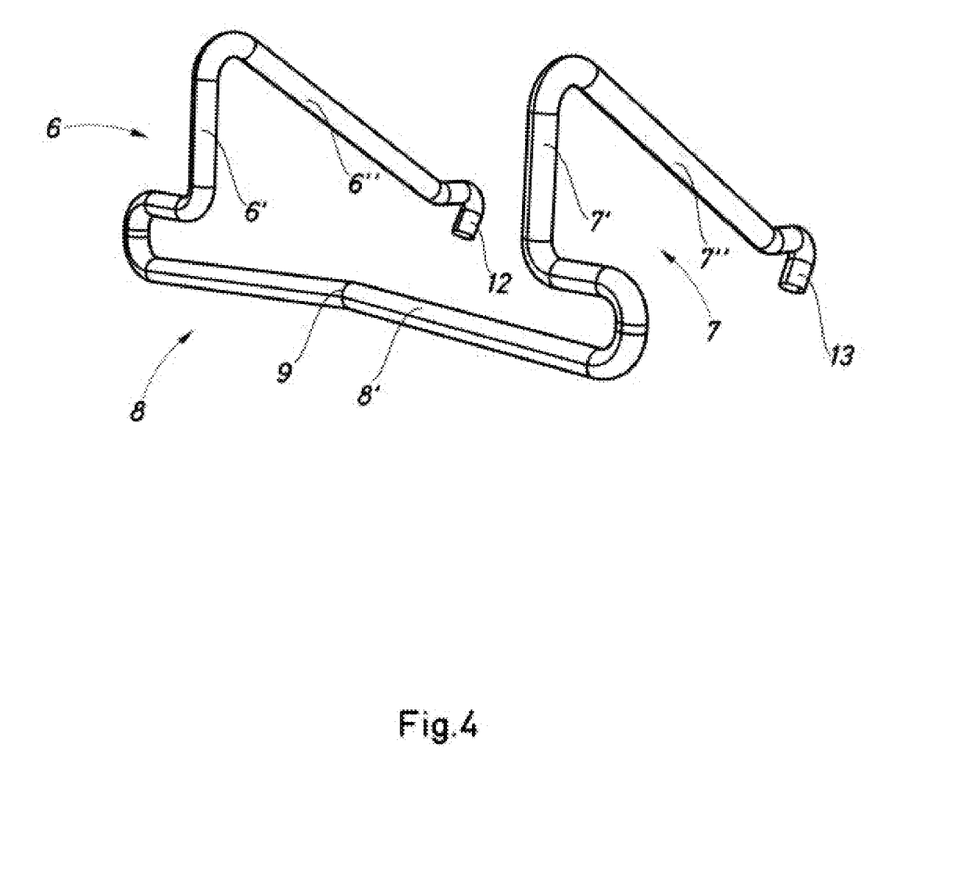
FIG. 4 is a perspective view of an embodiment of the clamp of the invention based on a single rod of spring steel.
Figure 5:
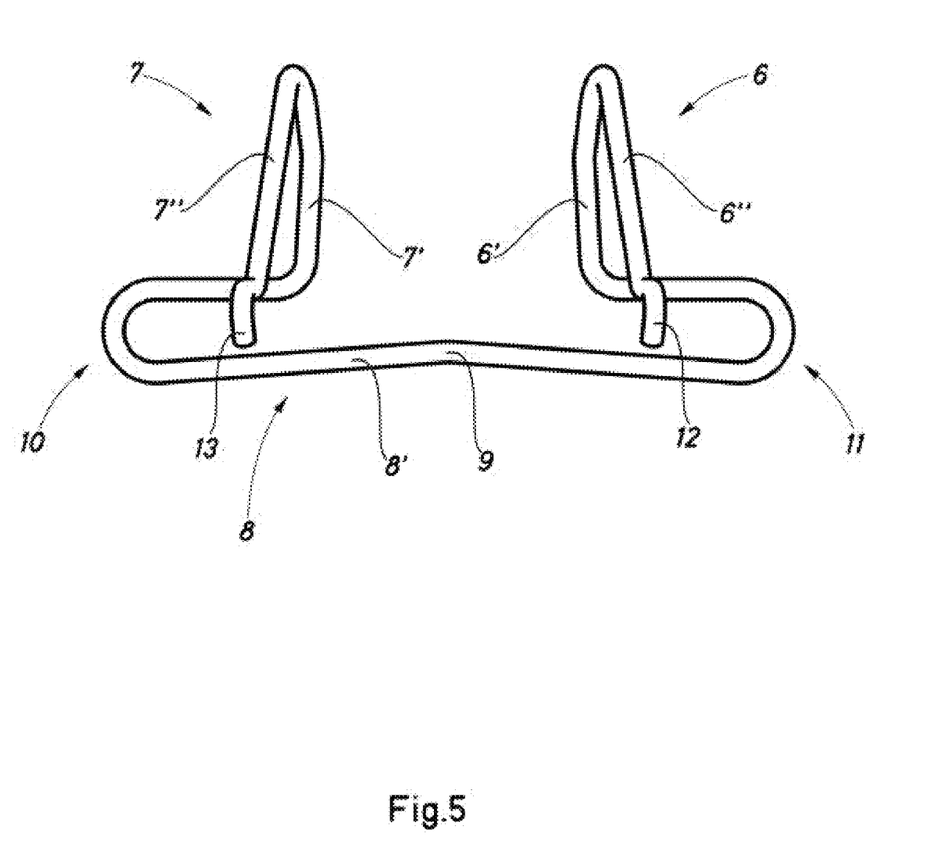
FIG. 5 shows a front view in elevation, from the fixing ends on the plate, of the same element shown in FIG. 4.

Said prop of the present invention has, connected to the upper face of the plate -2-, an elastic clamp for centring and coupling that has two wings -6- and -7- of the elastic type intended to press on the side walls of the beam -3- for holding the prop in position, preventing it from falling and limiting its rotation about its own axis. For this, in a preferred embodiment, the clamp comprises a section of spring steel rod with folded wings -6- and -7- connected to a bridge or loop -8- for coupling to the plate -2-, by inserting the plate in the loop, achieving retention of the prop by two sides of said wings, at the same time allowing centring of the prop with the other two sides, limiting the rotation of the prop about its axis. In more detail, in the embodiment shown as a suitably folded single rod of spring steel, as can be seen in FIGS. 4 and 5, the prop carries, incorporated simply by elastic retention, the rod element provided with the two wings -6- and -7- joined together by a lower loop -8- that fits elastically on the plate -2-. Each of the wings -6- and -7- is formed by two arms such as -6'-, -6"- and -7'-, -7"-, and each wing can form a structure of inverted V shape, inverted U shape or similar, giving a minimum of one arm -6'-, -7'- for support on the side walls of the beam to be supported and a minimum of another arm -6"-, -7"- slightly displaced laterally for performing the function of centring the beam in the case of partial rotation of the prop about its axis. This can best be seen in FIG. 5, which shows the lateral displacement between the arms -6'-, -6"- and -7'-, -7"-, of each wing, to allow the functions described, of fixing on the beam and centring, limiting the rotation of the prop with respect to its axis.

As can be seen, the loop -8- has a lower side -8'-, FIGS. 4 and 5, slightly convex in its middle part -9- to improve contact with the lower face of the plate -2-, the arm -8'- of which is prolonged at both ends by respective curved zones -10- and -11-, for example U-shaped, V-shaped or similar, intended to fit together with the plate -2- in its positioning.

Figure 1:
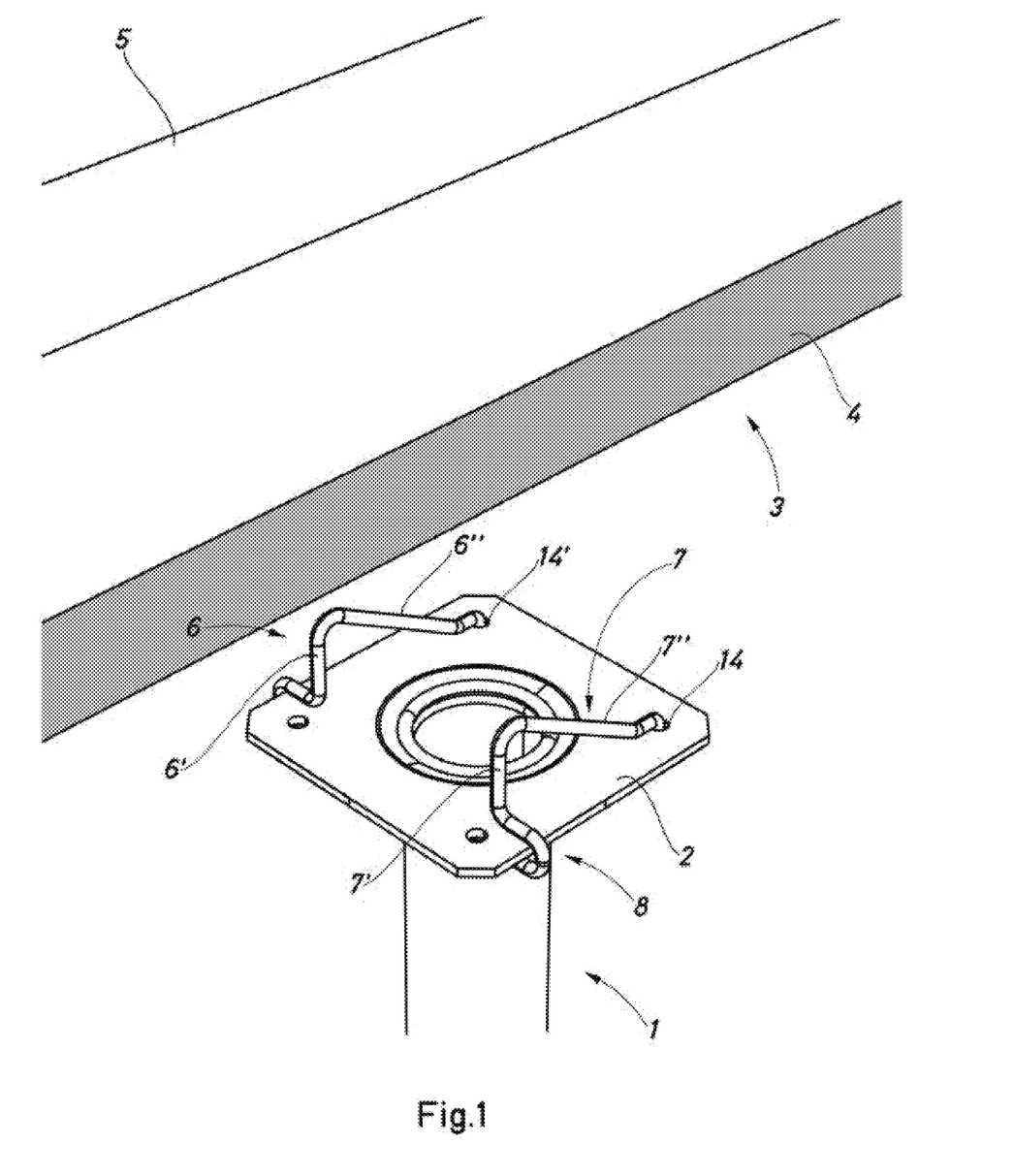
FIG. 1 shows a perspective view showing the relative position of the upper end of a prop that incorporates the clamp, made of steel rod, with respect to the mixed beam to be supported.
Figure 2:
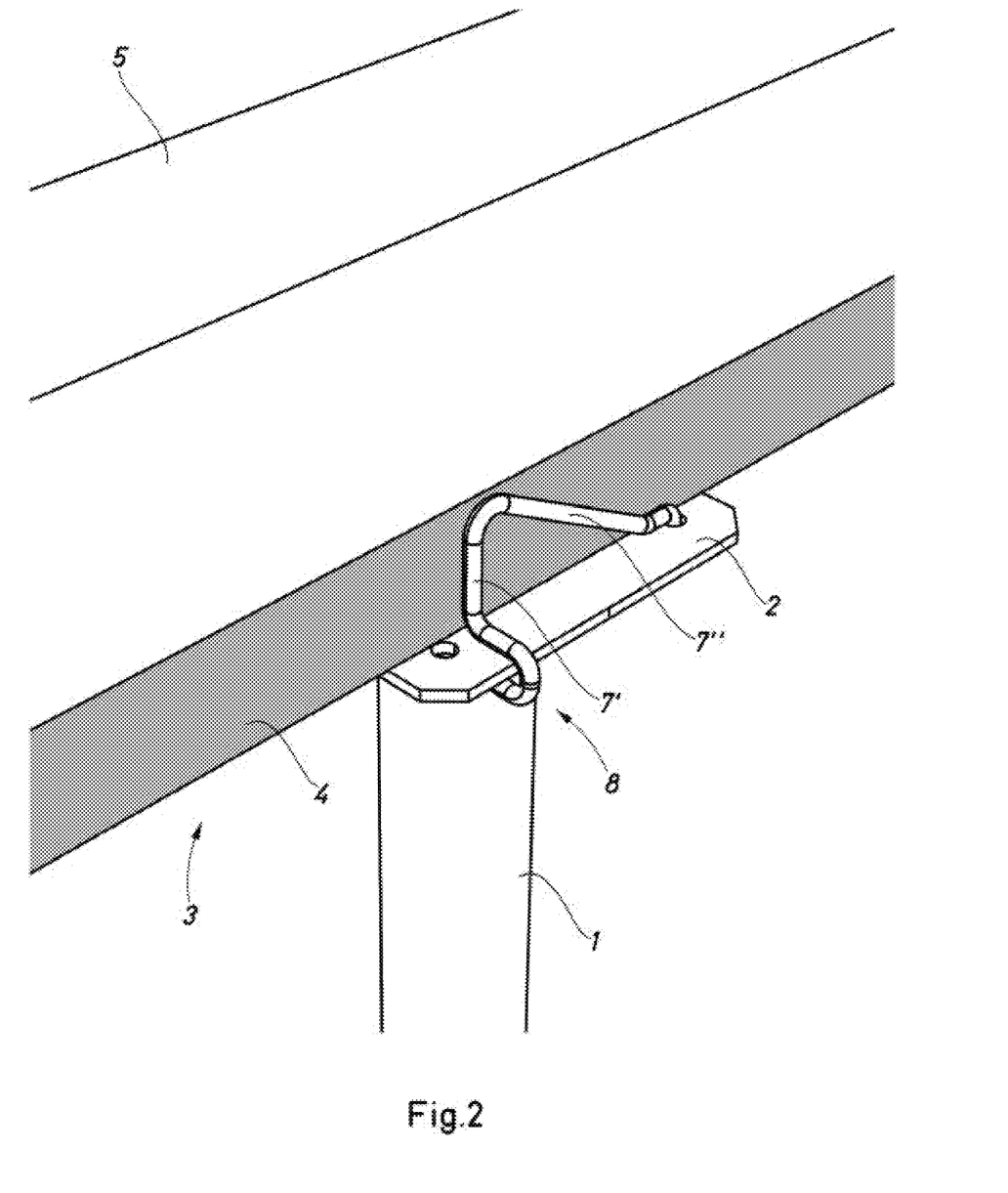
FIG. 2 is a view similar to FIG. 1, showing the prop coupled to the beam to be supported, the lateral centring and retaining wings of the clamp being supported on the lateral faces of the supported beam.
Figure 3:
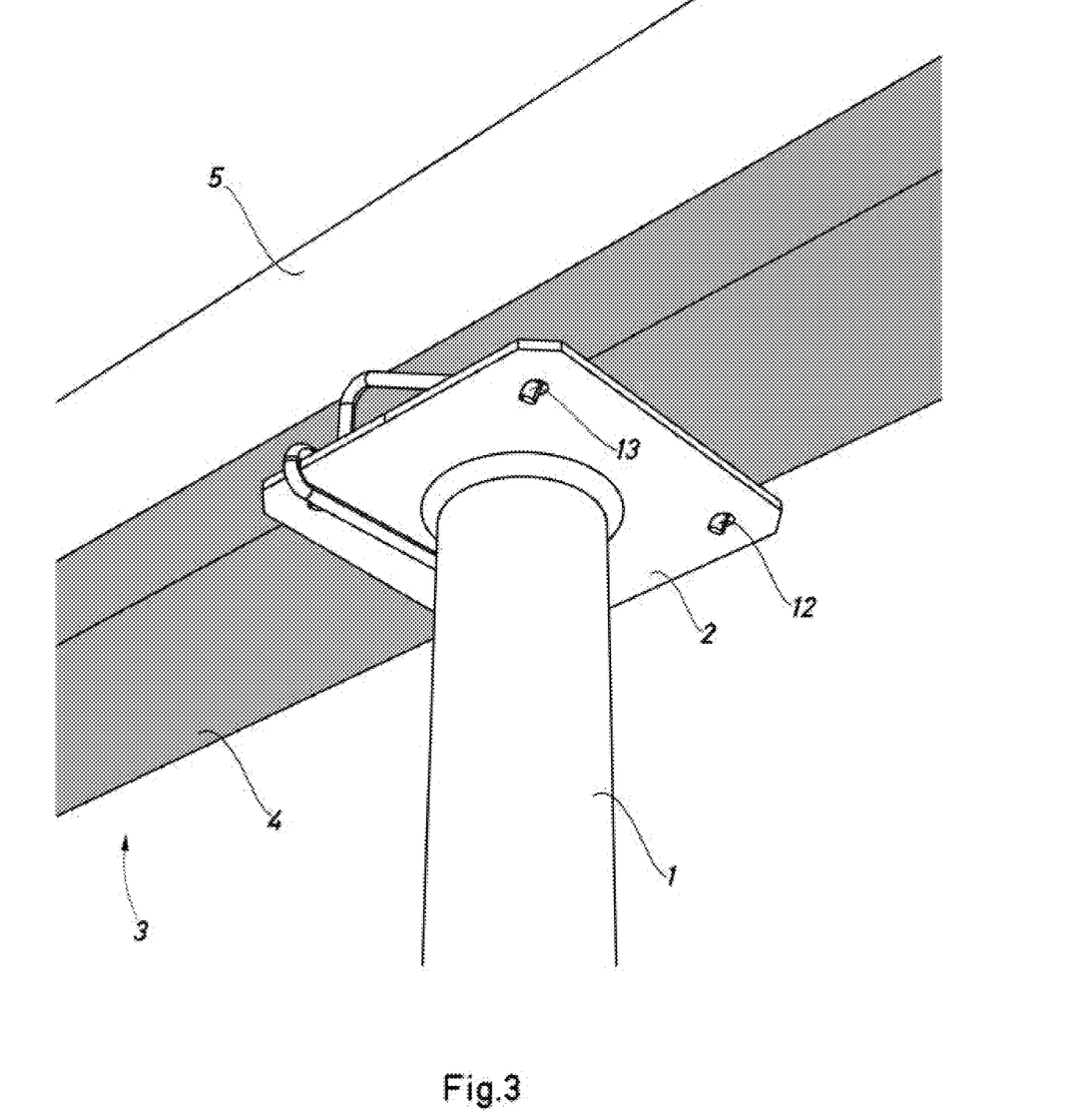
FIG. 3 is a perspective view of the same elements as in FIGS. 1 and 2, from a part located under the top plate of the prop.

Retention of the rod element on the plate -2- is completed by introducing the folded ends -12- and -13- of the corresponding sides -6"- and -7"- of the wings into respective holes, such as -14- and -14'-, which are shown in FIG. 1.

By means of the present invention, assembly of the prop can be facilitated considerably, since the worker, from below the beam -3-, with feet on the ground or on the corresponding floor of the structure, will simply have to press gently on the prop from the bottom upwards, inserting it in the bottom part of the beam, the prop being retained laterally by the elastic wings connected to the plate -2-, in particular in the case of the example shown, by the arms -6'- and -7'-, whereas the arms and -7"- are slightly displaced with respect to the arms -6'- and -7'-, performing a function of centring the prop with respect to the beam, limiting any rotation of said prop about its axis of symmetry. Similarly, disassembly of the prop can be effected simply by pulling when the recovery operation is taking place.

As will be understood, the wings connected to the plate -2-, which in the example shown in the figures consist of a single element made of spring steel rod, could be produced in many other shapes and materials, for example, multiple wings, laminar wings welded or riveted to the plate, elastic clamps with some other structure and different fixing, which would be included within the scope of the present invention.

The present invention therefore comprises in combination the elastic clamp for centring and coupling that has been described and the prop configured for fixed coupling of said clamp on the top plate of the prop, as well as the method of assembly. It incorporates a novel prop according to the invention that is very easy to couple to a beam, especially a beam for supporting floorshuttering by the simple presentation of the prop from the bottom part of the beam by the worker, coupling the clamp elastically on the bottom part of the beam, exerting pressure on the two lateral faces thereof, all without limitation of the place where the coupling is carried out, since the new prop provided with the clamp does not require any special feature of the beam for centring the prop, as was usual in the prior art.

Therefore, to summarize, the prop according to the present invention consists, according to one aspect, of a right foot with means of support on a lower supporting surface, means for varying the height and for fixing at the height selected, as well as a plate fixed to the upper end of the prop, so that the upper end of the prop has a minimum of two coupled elastic wings able to hold and exert pressure on the opposite lateral faces of the beam to be supported by the prop, allowing the prop to be retained at the selected place along the beam to be supported and preventing it falling and rotating sideways.

According to another aspect, each of the wings has one side for bearing with pressure on a lateral face of the beam to be supported and another side slightly separated with respect to the plane of symmetry of the part, intended to limit the rotation of the prop about its axis.

According to another aspect of the invention, the elastic wings are connected to the top plate of the prop.

According to another aspect of the invention, the wings are extensions of the top plate of the prop.

According to another aspect of the invention, the elastic wings consist of respective elastic rods of inverted U shape or inverted V shape or similar.

In another variant of the invention, the elastic wings made of rod form part of a single body made of rod that has a lower loop that can be coupled by insertion to the top plate of the prop and, as a minimum, two inverted U-shaped or inverted V-shaped structures that determine both the sides for fixing with pressure on the side walls of the beam, and the sides that are slightly off-centre with respect to the plane of symmetry, to limit the rotation of the prop about its axis.

According to another aspect, the free ends of the inverted U-shaped or inverted V-shaped structures of the wings made of rod are folded to allow their insertion and retention in holes in the plate of the prop.

According to another aspect, the loop of the body made of spring steel rod for retention on the top plate of the prop has a lower side provided with slight upward convexity to determine the contact zone with the lower face of the top plate of the prop.

According to another aspect, the invention comprises a prop provided with means of support on a supporting surface, means for varying the height and for fixing at the height selected, as well as a plate fixed on the upper end of the prop, where the upper end of the prop carries, mounted firmly, an elastic clamp according to the aspects mentioned above.

According to another aspect, the invention comprises a method of assembly that includes:
  fixed mounting of an elastic clamp as described above on the top plate of the prop, introducing the plate into the loop of the clamp and the folded ends of the arms of the latter into respective holes of the plate of the prop,
  presenting the prop with the upper clamp fixed to the lower face of the supporting beam of shuttering at the point freely selected along the latter, and
  pressing the prop, from the bottom upwards, against the bottom part of the beam so that the wings of the clamp open elastically to hold the prop in the place selected for the clamp, and
  setting the prop upright, supported at the bottom on the supporting floor.

Although the invention has been presented and described with reference to embodiments thereof, it will be understood that these do not limit the invention, therefore variations of many design or other details will be obvious to a person skilled in the art after interpreting the subject matter that is disclosed in the present description, claims and drawings. Accordingly, all variants and equivalents will be included within the scope of the present invention if they may be considered to be within the more extensive scope of the following claims.

The invention claimed is:

1. An elastic clamp for coupling a prop to a beam comprising:
   at least two elastic wings able to hold and exert pressure on opposite lateral faces of the beam to be supported by the prop, to allow the prop to be retained in a place selected along the beam to be supported, and to prevent the prop from falling and rotating sideways, and
   a lower loop,
   wherein each elastic wing is terminated in a folded free end at one end and the at least two elastic wings are connected by the lower loop at other end, and
   the folded free end and the lower loop are configured to couple to the prop by inserting a top plate of the prop into the lower loop of the clamp and the folded free ends into respective holes of the top plate of the prop.

2. The elastic clamp for coupling a prop to a beam according to claim 1, wherein each wing has a first side for bearing with pressure on a lateral face of the beam to be supported and a second side slightly separated with respect to a plane of symmetry of the at least two elastic wings, intended to limit the rotation of the prop about a vertical axis thereof.

3. The elastic clamp for coupling a prop to a beam according to claim 2, wherein the at least two elastic wings consist of respective elastic rods of inverted U shape or inverted V shape.

4. The elastic clamp for coupling a prop to a beam according to claim 2,
   wherein:
   the at least two elastic wings are made of a single body of rod that has the lower loop that can be coupled by insertion to the top plate of the prop, and
   each wing comprises an inverted U-shaped or inverted V-shaped structure that determine the first side for fixing with pressure on the side walls of the beam, and the second side that are slightly off-centre with respect to the plane of symmetry, to limit the rotation of the prop about its axis.

5. The elastic clamp for coupling a prop to a beam according to claim 4, wherein the each of second sides of the inverted U-shaped or inverted V-shaped structures of the at least two elastic wings are terminated in the folded free end to be inserted into holes in the plate of the prop.

6. The elastic clamp for coupling a prop to a beam according to claim 4, wherein the lower loop of the single body of rod for retention thereof on the top plate of the prop has a lower side provided with slight upward convexity to determine the contact zone with the lower face of the top plate of the prop.

7. The elastic clamp for coupling prop to a beam according to claim 2, wherein the elastic wings are connected to the top plate of the prop.

8. The elastic clamp for coupling prop to a beam according to claim 2, wherein the wings are extended from the top plate of the prop.

9. A prop for supporting a beam comprising:
   a post having a lower supporting surface, a height of said post being adjustable,
   a plate fixed on an upper end of the post, and
   an elastic clamp incorporated on the upper end of the post wherein the elastic clamp comprising:

at least two elastic wings able to hold and exert pressure on opposite lateral faces of the beam to be supported by the prop, to allow the prop to be retained in a place selected along the beam to be supported, and to prevent the prop from falling and rotating sideways, and a lower loop, wherein each elastic wing is terminated in a folded free end at one end and the at least two elastic wings are connected by the lower loop at other end, and the folded free end and the lower loop are configured to couple to the prop.

10. The prop according to claim 9, wherein the elastic clamp is firmly mounted on the upper end of the post.

11. The prop according to claim 9, wherein the elastic clamp is detachably mounted on the upper end of the post.

12. A method for assembling a prop according to claim 9, comprising:

Incorporating the elastic clamp in the top plate of the prop, presenting the prop with the elastic clamp fixed to the lower face of the supporting beam of shuttering at the freely selected point along it, and pressing the prop, from the bottom upwards, against the bottom part of the beam so that the at least two wings of the clamp open elastically to hold the prop in the selected place of the clamp, and setting the prop upright, supported at the bottom on a supporting floor.

13. The method for assembling a prop according to claim 12, wherein the elastic clamp is incorporating on the top plate of the prop in a fixed manner, and further comprises step of introducing the plate into the loop of the elastic clamp and the folded free ends into respective holes of the plate of the prop.

* * * * *